(12) United States Patent
Segura (10) Patent No.: US 7,165,780 B2
(45) Date of Patent: Jan. 23, 2007

(54) PULL-BACK MECHANISM FOR A COVERING FLAP OF AN AIR BAG SYSTEM

(75) Inventor: Jose Maria Segura, Cerdanyola (ES)

(73) Assignee: Peguform GmbH & Co. KG, Bötzingen (DE)

( * ) Notice: Subject to any disclaimer, the term of this patent is extended or adjusted under 35 U.S.C. 154(b) by 205 days.

(21) Appl. No.: 10/500,621

(22) PCT Filed: Jan. 7, 2003

(86) PCT No.: PCT/EP03/00080

§ 371 (c)(1), (2), (4) Date: Jun. 29, 2004

(87) PCT Pub. No.: WO03/064219

PCT Pub. Date: Aug. 7, 2003

(65) Prior Publication Data

US 2005/0067819 A1    Mar. 31, 2005

(30) Foreign Application Priority Data

Feb. 1, 2002   (DE) ................... 102 04 333

(51) Int. Cl.
*B60R 21/20* (2006.01)
(52) U.S. Cl. .................................. 280/728.3
(58) Field of Classification Search ............ 280/728.3, 280/732, 731
See application file for complete search history.

(56) References Cited

U.S. PATENT DOCUMENTS

| | | | | |
|---|---|---|---|---|
| 5,899,488 A | * | 5/1999 | Muller | 280/728.3 |
| 6,126,195 A | * | 10/2000 | Lutz | 280/737 |
| 6,161,864 A | * | 12/2000 | Heilig | 280/728.2 |
| 6,315,321 B1 | * | 11/2001 | Lutz | 280/728.3 |
| 6,651,998 B1 | * | 11/2003 | Mayer et al. | 280/728.3 |
| 6,929,281 B2 | * | 8/2005 | Loeper et al. | 280/728.3 |

FOREIGN PATENT DOCUMENTS

| | | |
|---|---|---|
| DE | 42 17 174 A1 | 11/1993 |
| DE | 44 42 543 A1 | 1/1996 |
| DE | 197 24 594 A1 | 1/1998 |

(Continued)

*Primary Examiner*—Faye M. Fleming
(74) *Attorney, Agent, or Firm*—Henry M. Feiereisen; Ursula B. Day (57) ABSTRACT

The invention relates to a mechanism for triggering a gasbag which is arranged below the surface of a dashboard or a paneling of a vehicle. Gasbags of this type are generally referred to as airbags and are filled with a propellant. When the airbag is triggered, the pressure of the puffing-out sack actuates a flap 8 which is provided at its outer end with a connecting element 13. The connecting element can be designed as a slack tension cable, stiff lever or as a strap. When the airbag is actuated, the flap 8 is rotated about its hinge point and pulled rearward (i.e. away from the person to be protected) by the connecting element. This releases an opening in the vehicle interior paneling for the passage of the airbag. The arrangement of the airbag and of the flap require minimal depth dimensions for the airbag construction in the dashboard and therefore permits greater freedom in the configuration of the dashboard and therefore leads to greater space within the vehicle.

12 Claims, 9 Drawing Sheets

FOREIGN PATENT DOCUMENTS

| | | |
|---|---|---|
| DE | 297 21 644 U1 | 5/1998 |
| DE | 197 26 878 A1 | 10/1998 |
| DE | 197 29 472 C1 | 11/1998 |
| DE | 199 34 600 A | 1/1999 |
| DE | 197 33 896 A1 | 2/1999 |
| DE | 197 50 182 A | 5/1999 |
| DE | 198 55 909 A | 6/1999 |
| DE | 198 60 840 A1 | 9/1999 |
| DE | 299 11 205 U1 | 9/1999 |
| DE | 198 43 191 A1 | 3/2000 |
| DE | 199 41 442 A1 | 5/2000 |
| DE | 198 60 932 A1 | 7/2000 |
| DE | 198 60 933 A1 | 7/2000 |
| DE | 100 03 706 A1 | 8/2000 |
| DE | 100 01 040 C1 | 2/2001 |
| DE | 199 58 585 C | 2/2001 |
| DE | 199 60 251 A1 | 6/2001 |
| DE | 100 27 122 A1 | 12/2001 |
| EP | 0 798 176 A1 | 10/1997 |
| EP | 0 867 346 A1 | 9/1998 |
| EP | 0 900 703 A1 | 3/1999 |
| EP | 0 970 856 A2 | 1/2000 |
| EP | 1101 665 A2 | 5/2001 |
| WO | WO 96/30232 | 10/1996 |
| WO | WO 99/46152 | 9/1999 |
| WO | WO 99/61288 | 12/1999 |
| WO | WO 01/10684 A1 | 2/2001 |
| WO | WO 01/14172 A1 | 3/2001 |
| WO | WO 03/064219 A1 | 8/2003 |

* cited by examiner

PULL-BACK MECHANISM FOR A COVERING FLAP OF AN AIR BAG SYSTEM

BACKGROUND OF THE INVENTION

The dashboard paneling or door paneling of a vehicle comprises a covering layer which serves as a boundary to the passenger compartment. It generally comprises a support layer, a foam layer and a film. If less value is placed on esthetic requirements in the vehicle interior, whether for cost reasons or because of increased demands on the robustness of the dashboard paneling, for example in the case of commercial vehicles or off-road vehicles, it can be limited to the support layer. This support layer is produced, for example, from polypropylene by injection molding. As an alternative, the support may be coated with a decorative film. A weakened structure is provided in the paneling, which structure makes it possible for a safety mechanism which is mounted behind the paneling and is invisible to the passenger to be triggered in the event of an emergency and to pass explosively through the paneling. In order to increase the safety of the passengers, airbag devices are mounted at various points in motor vehicles. The airbag devices are mounted in the interior paneling of the vehicle in a manner such that they are invisible to the passenger and can be provided in the door side paneling, in the A-pillar, in the roof section, in the dashboard, under the seats or in the steering column. If the airbag is triggered, the structure of the vehicle interior paneling has to be destroyed. If a weakened area were not provided, the triggering would proceed in an uncontrolled manner and parts of the vehicle interior paneling would be blasted away. The explosive force required in order to puff out the airbag in good time in the event of a crash can have the effect that parts of the interior paneling are torn off at the same time into the passenger compartment and can cause the occupants severe injuries. All of the airbag devices known from the prior art and a few of which have already been mentioned by way of example mention this problem.

When the airbag is triggered, in order to protect the occupants from splintering parts, a connection is provided between the dashboard paneling, or more precisely the support layer thereof, and the triggering mechanism.

Airbag covers are generally pulled back into the module housing by a mechanism. This pull-back mechanism can comprise deflecting rollers, slides, hinges or the like. In the case of all known pull-back devices, this requires increased space on the engine side of the dashboard or steering column, which side is invisible to the occupant. This required space increases the required longitudinal dimensions of the component accommodating the airbag, for example, the dashboard support, the door side paneling, the steering column or one of the A, B, C pillars, i.e. the connecting struts which are used for accommodating the windshield, doors and roof construction. Pull-back devices actuated by gas or hydraulic cylinders require at least one separate space behind the actual airbag module.

For example, the following airbag triggering mechanisms are known from the prior art:

DE10001040 (Autoliv) A tension band which is mounted in each case at one end of the covering flaps holds the covering flap in an open position while the surface tears open at the (centrally) mounted predetermined breaking point. In this case, the covering flap parts protrude a good distance into the vehicle interior, with the result that it cannot be ruled out that occupants who are in a position which does not correspond to the standard position, when the airbag is triggered, may become injured.

DE19750182 (Autoliv) Covering flap with a lifting unit to which gas is admitted and which displaces the flap parts to the rear when the airbag is actuated. Although this solution permits the covering flap parts to be pulled back, it requires additional structural space in that region of the dashboard which faces away from view.

DE19855909 (TRW) Opening of the airbag causes lateral pushing away and sliding off of the two covering flap parts. In this design, a gas generator which is to be installed separately is also required, said gas generator requiring a relatively large structural space behind the airbag covering (on that side of the dashboard which faces away from view).

DE19958585 The gas pressure deforms a piston which acts on a pull cord or film which is connected to outer ends of the covering flaps. The deformation or displacement of the piston causes tensioning of the pull cord, and therefore tears open the flap and the airbag can emerge through the interior paneling structure. The relatively complicated design of the gas channels also has the effect of enlarging the structural space behind the interior paneling.

DE19860932 (Petri) shows a multi-part airbag with various unfolding directions. This patent shows the necessity of providing different construction variants for opening the covering flaps in order to take into account the different stages of the unfolding of the gasbag and directions of expansion of the gasbag.

DE 19860933 (Petri) deals with an airbag in the roof region, comprising two sections which are unfolded at an angle to each other. As already illustrated in DE19860932, the special opening sequences and the arrangement of airbags often result in only very small structural spaces which are only available to the opening mechanism. In a further design, a retaining band is fastened to the airbag or the airbag is constricted. If the covering flaps are pulled away laterally, the airbag can also be unfolded unhindered using the construction according to the invention, and also local constrictions which contribute to better protection for the occupants can be integrated in the airbag construction.

The airbag device WO0114172 (Inova) is pulled back, so that part of the vehicle interior paneling is pulled back into the dashboard by a pull-back mechanism actuated by gas pressure, electrically or mechanically. This construction avoids the flinging of paneling parts into the vehicle interior and permits unhindered unfolding of the airbag. If, however, the actuation takes place by a mechanism which does not use the gas pressure, which is in any case released when the airbag is triggered, disturbances in synchronization may occur, since individual, electrically controlled circuits may fail in the event of a crash. A further disadvantage of this arrangement is the large requirement for structural space behind the actual airbag and the triggering mechanism.

SUMMARY OF THE INVENTION

The invention relates to an airbag construction for protecting vehicle occupants in a motor-driven vehicle, having an airbag which is concealed in the normal operating state of the vehicle and is stowed folded up in an airbag housing and is connected to a gas pressure source which, when a crash situation is perceived by the crash sensor, uses the high pressure to suddenly puff out and inflate the airbag, the airbag thrusting in a targeted manner through the collapsing interior paneling 2, wherein the airbag actuates a flap 8 which is connected by a connecting element 13 to the interior paneling 2 which, by means of the opening via the tensile force which the connecting element exerts on the point(s) of weakness, produces a defined tear which destroys the interior paneling 2, in order to provide the passage space for the airbag, and pulls the region of the interior paneling 2 which contains the airbag covering 15 partially away from the vehicle interior or completely behind the interior paneling onto the side of the flap 8 which faces away from the airbag channel, so that the airbag can be unfolded unhindered and no parts of the airbag covering 15 can pass into the firing region of the airbag.

In the airbag triggering mechanism, a structural space 7 is in each case arranged laterally and receives the blasted away airbag covering 15. The airbag triggering mechanism comprises an internal paneling which comprises a covering layer, which serves as a boundary to the passenger compartment and can be formed, for example, as a film or plastic support, and/or comprises a support layer having an optional foam layer situated between the covering layer and support, and a connection between the support layer and triggering mechanism, wherein the airbag triggers the flap mechanism which tears open the airbag covering 15 at the weakness.

The flap mechanism comprises a flap 8 and a connecting element 13. The connecting element 13 is made from elastic material or can contain a fabric structure or can be designed as a rigid lever. The flap 8 retains the airbag in its folded up position. The connecting element 13 is rotated about a hinge point fixed on the module.

In order to avoid that the airbag unfolds laterally before the flap has completely opened and penetrates between the vehicle internal paneling and the flap, the flap is always of a width (distance from the rotary joint 10 as far as the center of the flap) which corresponds to the distance of the rotary joint 10 from the vehicle interior paneling 2. The airbag covering 15 always comes to lie behind the flap. The dimensions are selected in such a manner that neither flap nor airbag covering protrude to a great extent into the vehicle interior, in order to avoid it being possible for protruding parts to cause injuries to passengers who are not in the normal seat position (out of position).

As an alternative, intercepting bands can be sewn onto the airbag itself and can retain the airbag in the path of the firing channel.

The invention relates to a mechanism for triggering a gasbag which is arranged below the surface of a dashboard of a vehicle. Gasbags of this type are generally referred to as airbags and are filled by a propellant. When the airbag is triggered, the pressure of the puffing out sack is used to actuate a flap which is provided at its outer end with a pulling device. The pulling device can be designed as a slack tension cable, as a stiff lever or as a strap. When the airbag is actuated, the flap is rotated about its hinge point and is pulled to the rear (i.e. away from the person to be protected) by the pulling device. This releases an opening in the vehicle interior paneling for the passage of the airbag. The airbag outlet opening is contained in the vehicle interior paneling. The vehicle interior paneling generally comprises a support structure, a foam layer and a layer which determines the visual impression of the passenger compartment and can consist, for example, of a film. In order to guarantee a defined tearing behavior in the event of the triggering of the airbag, a weakened area is generally provided in the structure of the vehicle interior paneling. This weakened area can be designed as a tear seam. Other weakened areas, for example point-by-point perforations, slots or grooves may also be provided. The shape and visibility of the weakened areas have in general no effect on the invention. It is sufficient for one or more such weakened areas of the vehicle interior paneling to be provided.

Part of the interior paneling is therefore designed as an airbag cover. This airbag cover is pulled into a module, for example the dashboard or a steering wheel column, before the airbag puffs out or exits from the airbag device.

The invention bypasses the problems which may occur in the designs according to the prior art, by means of a lateral arrangement of the pull-back mechanism for the vehicle interior paneling.

A front-passenger airbag device is illustrated by way of example, but the invention is not restricted to uses in the case of front-passenger airbag devices; it can advantageously be used, for example, also in the case of side airbags, driver's side airbags, since the firing channel, folded airbag and pull-back mechanism as a whole require little space. The airbag construction according to the invention in the dashboard therefore affords relatively great freedom in the design of the dashboard. A further advantage is the greater space available within the vehicle.

The advantage of this arrangement resides in the fact that the casing is not displaced rearward, as shown in EP0867346, but rather the flap is shifted by the gas pressure.

A further advantage of using a flap which is pressed open directly by the gas pressure of the airbag is that no additional separate gas pressure drive is required, as is described in WO0114172.

Due to the large forces which act on the flap during the triggering process, it may be advantageous to fit an additional, reinforcing means to the flap mechanism in the region of the flap. This reinforcing means may be achieved in the form of ribs or by the use of composite materials (for example fiber-reinforced plastics, metal inserts).

If the two flap halves are arranged such that they partially overlap, the reinforcing ribs may also be arranged in an offset manner, so that the flap halves readily come to lie on one another. This variant also has the advantage that in the case of using a two- or multi-stage airbag, the flap reliably opens even at just the minimum opening pressure and, during a subsequent ignition at higher gas pressure, all of the parts which could be situated in the firing channel have already been pulled behind the flap. A two- or multi-stage airbag may reduce the risk of injury to occupants in a crash situation, depending on the severity of the impact. If the impact takes place at a low vehicle speed, a triggering at 100% of the gas pressure causes such a strong pressure that the person is injured by the pressure of the airbag because he/she is flung against the seat. Thus, with multi-stage airbags which are triggered at graduated gas pressures, an optimized triggering performance arises, depending in each case on the measured speed or momentum of the impact. Customary values these days amount to 60% of the overall pressure and 100%.

A further advantage of the invention resides in the fact that this variant can be used in all possible airbag positions, by uncoupling the gas generator and triggering mechanism. Not only front-passenger airbags, but also driver airbags, airbags in the door side paneling or airbags integrated in A, B, C pillars can be provided with the airbag triggering mechanism described.

According to the invention, a structural space which can receive the folding back parts is provided between the airbag module and fastening structure of the component. This structural space can be kept narrow by means of an advantageous design of the lever arm. In principle, an additional structural space in a lateral arrangement is to be preferred, since, for example, to great a depth can disadvantageously affect the esthetics of the interior and more space is provided for the occupants. This measure consequently permits an increase in the interior volume and more extensive design freedom in the interior region.

A further advantageous aspect is the fact that the folded up airbag can be held directly by the closed flap. The flap and flap mechanism are of single-part design and are connected to the firing channel by a rotary joint or a snap-in mechanism. The rotary joint or snap in mechanism can be provided with a small spring which holds the flap cover on the folded up airbag situated beneath it. Since only the small spring forces are required in order to keep the flap cover in its rest position, there are no delays during the triggering process.

The airbag and flap can be manufactured together; the only installation step required is the fitting of the structure which is connected to the support layer of a dashboard support, side paneling or to the upholstery itself. This structure can be designed as a fabric, slack tension cable, but also as a cast or welded-on stiff lever or as a strap. The lever may be injected together with the support layer, as is also already in practice according to the prior art in the case of airbag guides.

If the lever is to have increased stiffness and dimensional stability, then also a design in sheet metal is to be considered.

In another design, a mesh, for example a wire mesh, can be used, the mesh having a combination of elasticity and necessary tear resistance in order to withstand the sudden compressive forces which act on the fabric during triggering of the airbag.

DETAILED DESCRIPTION OF PREFERRED EMBODIMENTS

Figure 1:
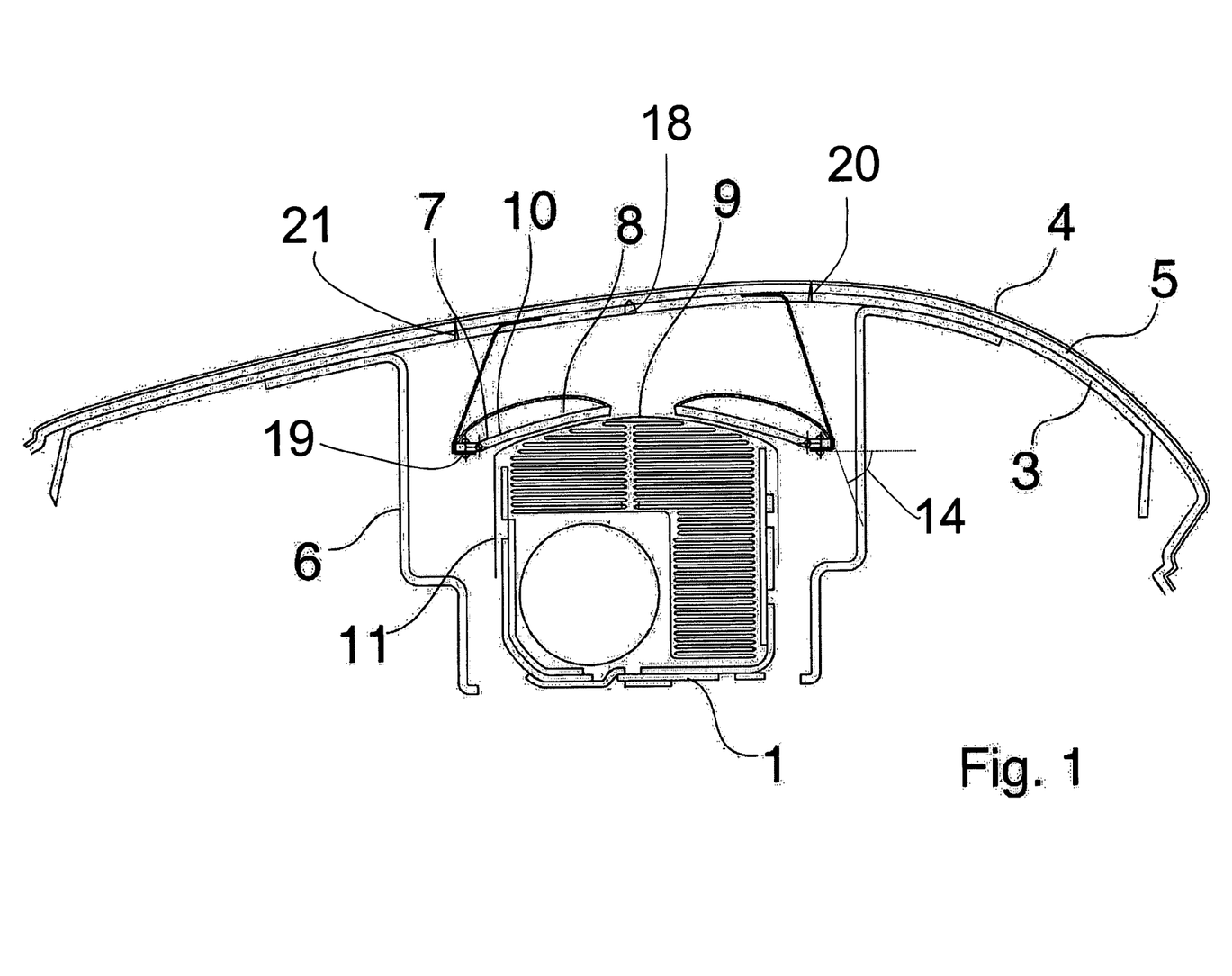
FIG. 1 shows a sectional illustration of an airbag device fitted in the vehicle interior paneling

FIG. 1 shows a sectional illustration of the airbag module 1 from that side of the vehicle interior paneling 2 which faces away from the interior of a vehicle, i.e. on the invisible side. The vehicle interior paneling comprises the support layer 3, the foam layer 4 and a film 5 (not illustrated in detail). A retaining device 6, into which the airbag module is inserted, is fitted to the support layer 3 of the vehicle interior paneling. The retaining device constitutes the continuation of the firing channel 11 and ensures that the airbag passes through the section of the interior paneling 2 which is arranged between the two arms of the retaining device 6. The airbag module 1 can be connected fixedly to the retaining device or can be fixed separately onto a frame construction which is used for the attachment of the interior paneling 2 (not illustrated in the present section). The retaining device 6 is connected fixedly to the support layer 3 of the interior paneling. The connection can take place by means of welding, bonding or else by injecting it together with the support material of the interior paneling. The section of the interior paneling 2 which has to be removed during triggering of the airbag is referred to as the airbag covering 15.

At least one laterally arranged structural space 7 is provided between the airbag module and the retaining device 6, which structural space is used to receive those parts of the airbag covering 15 which are blasted away when the airbag is triggered. The retaining device also has to have movement space for the flap mechanism in order to ensure that it folds back without hindrance. The flap mechanism comprises the flap 8, the rotary joint 10 and the connecting element 13, which can be designed as a lever, as a strap or as a flat tension cable or as a combination of these elements, and the airbag covering 15 connected thereto. In this case, lateral refers to the position relative to the airbag module. The lateral position increases the width dimension of the airbag, but not its depth dimension (in this case, the depth is defined as the distance from the surface which constitutes the boundary to the vehicle interior).

The airbag is retained in its starting or folded position 9 by means of a flap 8 which is part of the flap mechanism. The flap mechanism is connected in a hinged manner to the airbag module 1. The rotary joint 10 is preferably situated at the end of the firing channel 11, but the rotary joint should not be prevented from being offset to the rear in order to change the opening width. The flap mechanism retains the airbag in its folded position. One option is to provide a weak bonded connection to the folded up airbag which offers scarcely any resistance to the triggering process. In the embodiment according to FIG. 2, the flap is retained in its position by means of a retaining spring 17. A separate covering for the airbag can therefore be omitted. In a further exemplary embodiment, the support itself can be weakened in the region of the airbag triggering by the nub structure, namely by the provision of small wall thicknesses in the nub or groove base. The fabric keeps the ribbed, webbed or perforated surface together during the triggering, so that material cannot splinter off.

Since these structures are preferably also under tension during triggering of the airbag (EP1101665), the region of the support below which the airbag module is stored can be kept small. This has the consequence of a defined tearing behavior only along the seams of weakness provided for this purpose. During the normal operation of the vehicle this relatively small surface can withstand small impacts which are transmitted to the dashboard surface by passengers supporting themselves or by the weight of loaded goods.

Figure 2:
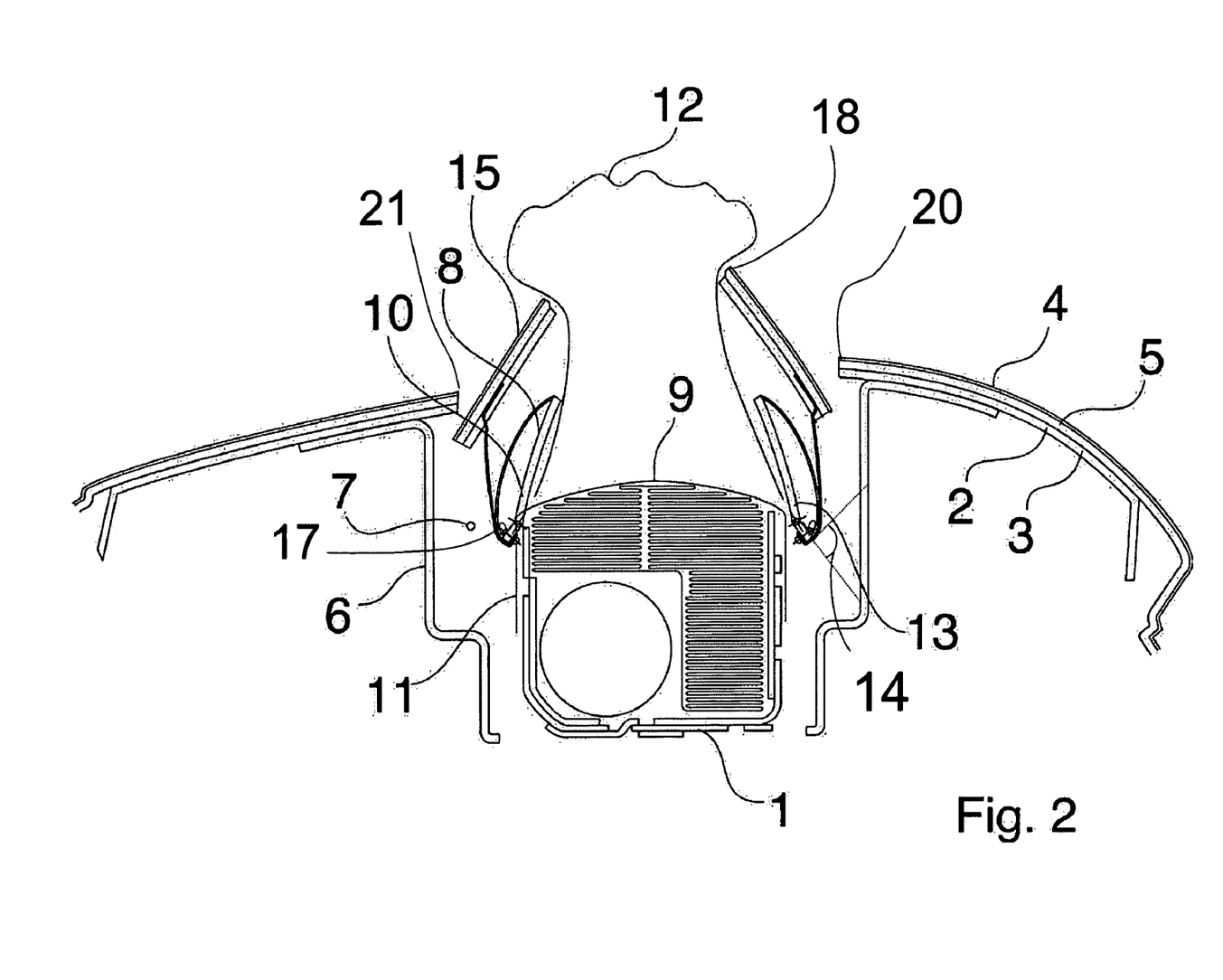
FIG. 2 shows the beginning of the triggering of the airbag using the triggering device according to the invention

FIG. 2 shows the beginning of the airbag triggering operation. The pressure exerted by the airbag 12 on the flap 8 causes the flap to open and introduces tensile forces into the tear seam. Said tensile forces cause the vehicle interior paneling 2 to separate into two or more parts. A tear seam 18 can be arranged centrally if, as illustrated in this example, there are two symmetrically opening airbag covering parts 15. However, it is just as conceivable also to use asymmetrically arranged tear seams and asymmetrical flaps with the structural space required being changed.

For the operation of the flap mechanism, a respective weakened area 20, 21 of the vehicle interior paneling 2 may additionally also be provided on the outer side edges of the airbag covering 15.

Owing to the tensile load when opening the flap, the airbag covering 15 is pulled into the structural space 7 by the pressure on the airbag, with the result that it comes to lie on that side of the flap which faces away from the airbag, and cannot pass into the firing region of the airbag. In order to make oblique sliding off possible, the weakened areas 20, 21 designed as tear seams can be arranged at an angle other than 90° with respect to the surface of the interior paneling.

Figure 3:
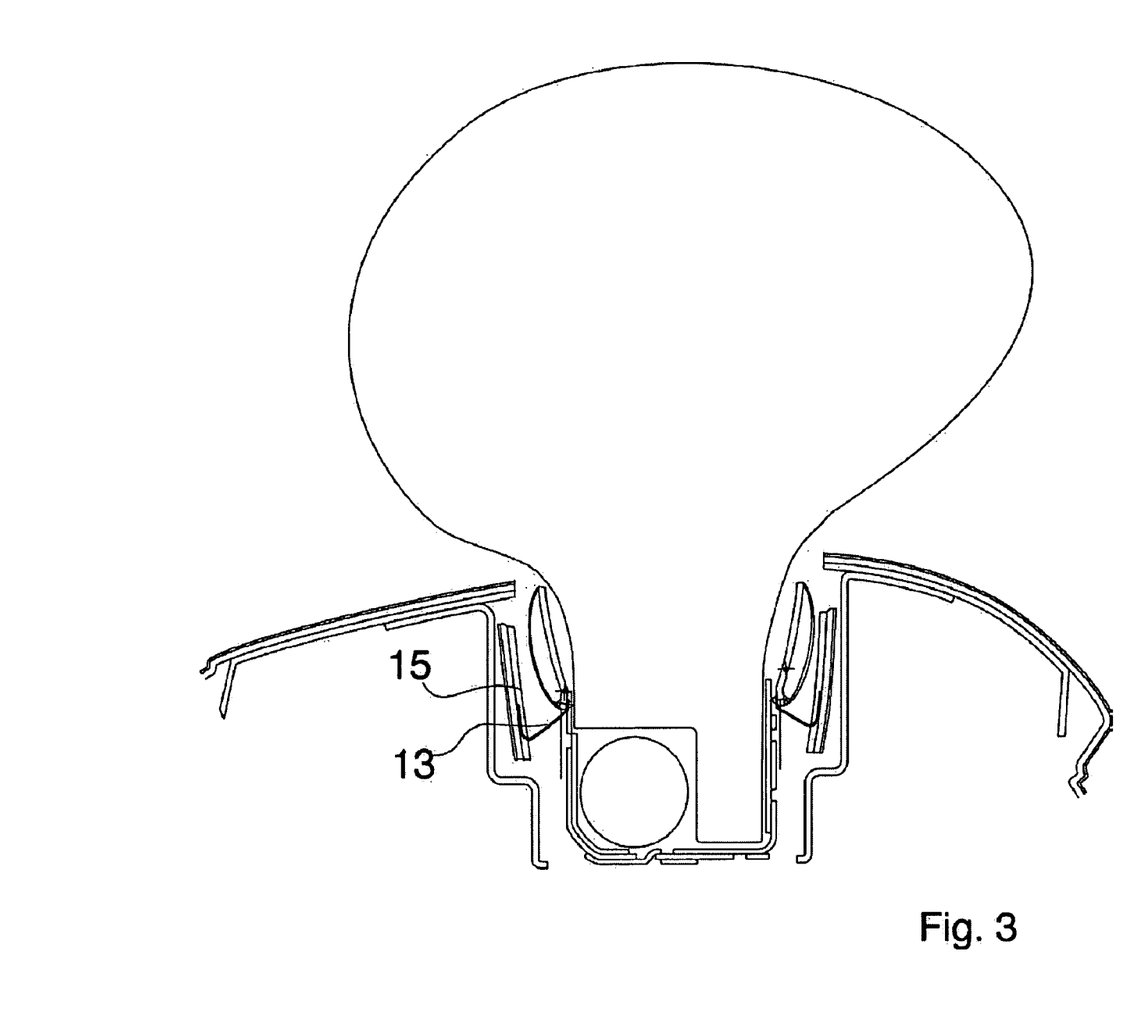
FIG. 3 shows the end of the airbag triggering and the pull-back mechanism in its final position
Figure 4:
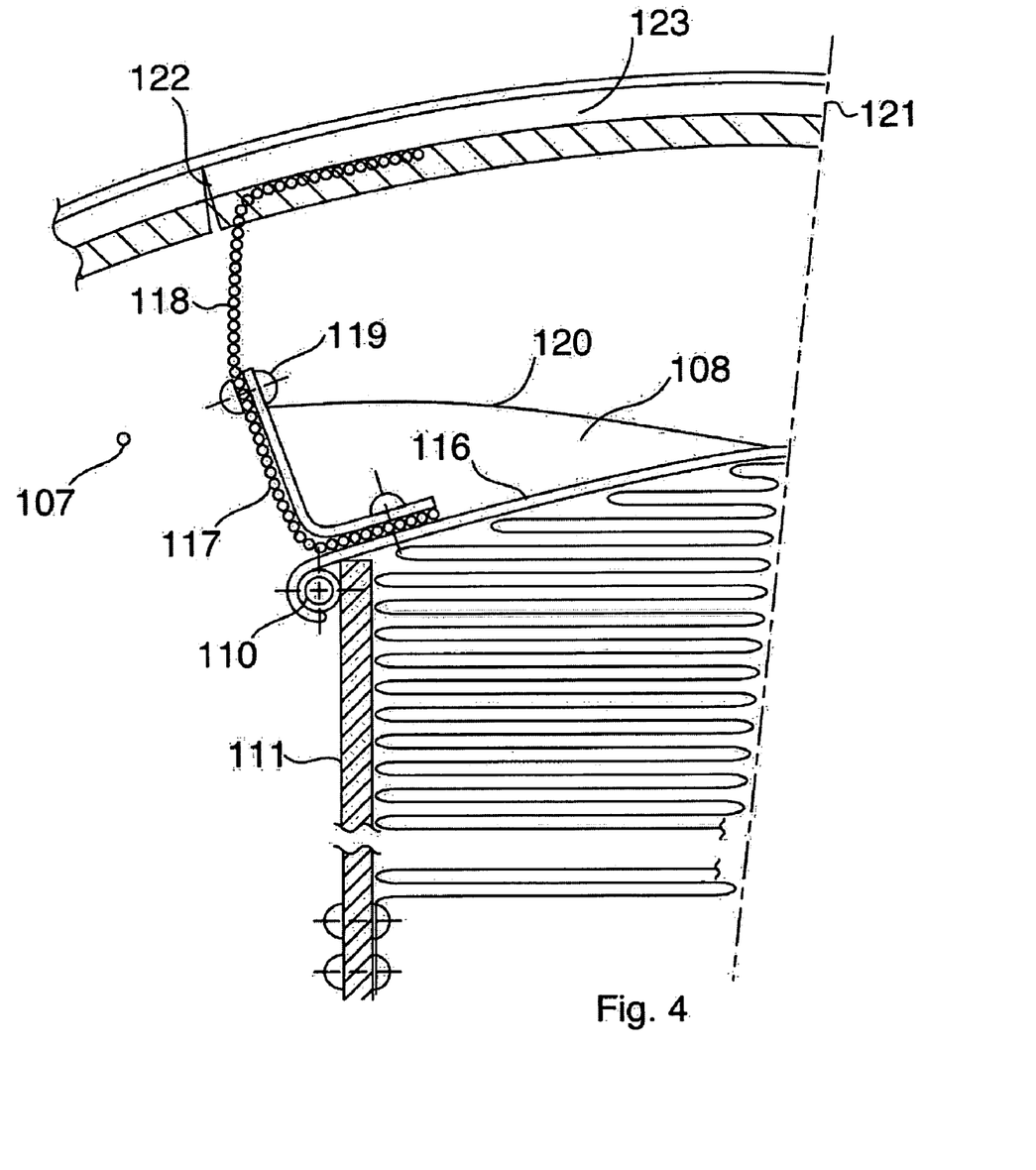
FIG. 4 shows a detail of the pull-back mechanism in a first embodiment
Figure 5:
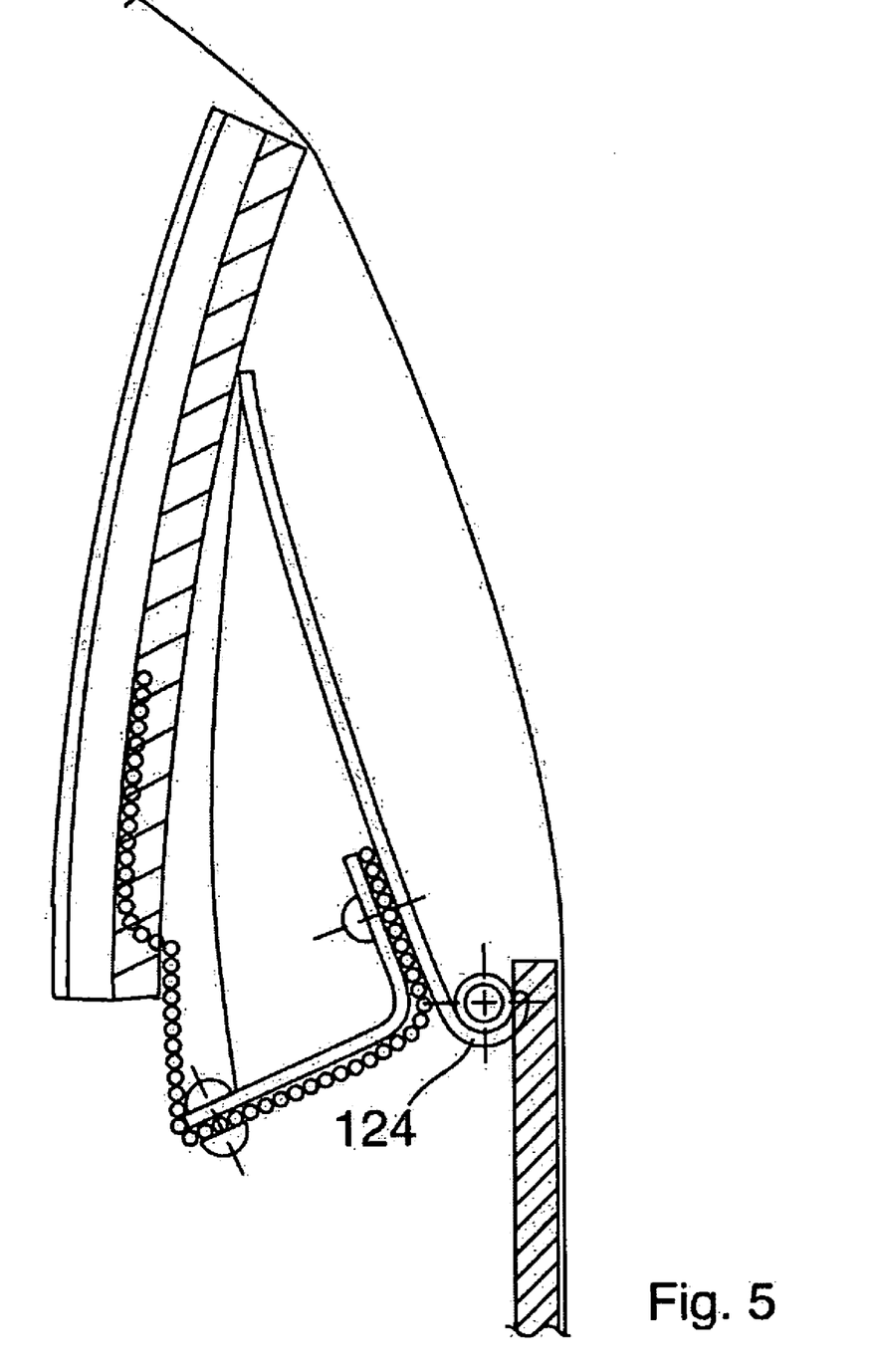
FIG. 5 shows a detail of the pull-back mechanism of FIG. 4 in its final position

FIG. 3 shows the position of the airbag flap with the airbag completely unfolded. In this illustration, the slot is so narrow that the flap 8 occupies the entire space between the airbag module and vehicle interior paneling 2; in the case of wider slots, it is conceivable for the separated part of the vehicle interior paneling to extend somewhat further into the passenger compartment. In FIGS. 4 and 5, this case is illustrated more precisely. The airbag triggering process illustrated in FIGS. 1–3 can only proceed in the manner illustrated if the connecting element 13 is designed to be so stiff that the angle of adjustment 14 between the arm 19 originating from the rotary joint 10 and the connecting element 13 is essentially maintained. Only in this manner is it possible for the airbag covering 15 to come to lie behind the flap when the airbag is triggered.

FIGS. 4 and 5 illustrate schematically the tearing-open process for a second embodiment of the flap mechanism. In this embodiment, the flap mechanism comprises three parts, the closure flap 116, the lever arm 117 and the tension connection 118, which are connected to a part of the vehicle interior paneling 102. The tension connection 118 can be designed as a tension cable, as fabric or as a fiber-reinforced, elastic layer. The connection to the lever arm 117 can be ensured by rivet connections, clamping connections, screw connections or bonding connections 119. In order to increase the dimensional stability of the flap mechanism, one or more stiffening ribs 120 may also be provided. The flap mechanism is connected at its second end to the vehicle interior paneling 2 by a tension connection 118. The connection is integrated in the support material, in which case it should be taken into consideration that the connection is suddenly under tension when the airbag is triggered. This tensile stressing has to be absorbed by the connection, which is under shearing force, between the support layer 3 or foam layer 4 or between both layers. A multiplicity of connecting options are known from the prior art; fabric structures, shaped parts having a ribbed geometry, a concertinaed geometry or similar geometry can be incorporated. The incorporation takes place by injecting, in the case of injection-molded supports, or by welding to the support or by bonding. Form-fitting connections, such as pressing a fabric structure onto nubs provided in the support can also fulfill this purpose. The fabric structure is subsequently bonded to the nubs by the foam if the fabric structure has been fitted on the visible side. A separate application of adhesive can be provided for fitting it on the invisible side toward the engine. In this embodiment, fabric structures which are preferably not thermally stable are used.

By means of the weakened area 122, the section of the vehicle interior paneling can also protrude in the end position over the edge of the flap, as is illustrated in FIG. 5. FIG. 5 furthermore illustrates the end position of the flap mechanism by the deflecting arm 124 on the rotary joint side resting on the wall of the firing channel 111. By securing this end position, it can be achieved that the section 123 of the vehicle interior paneling comes to lie in the imaginary line of extension to the firing channel. Another structural design of the rotary joint would also enable a V-shaped widening of the firing channel to be obtained (not illustrated).

Figure 6:
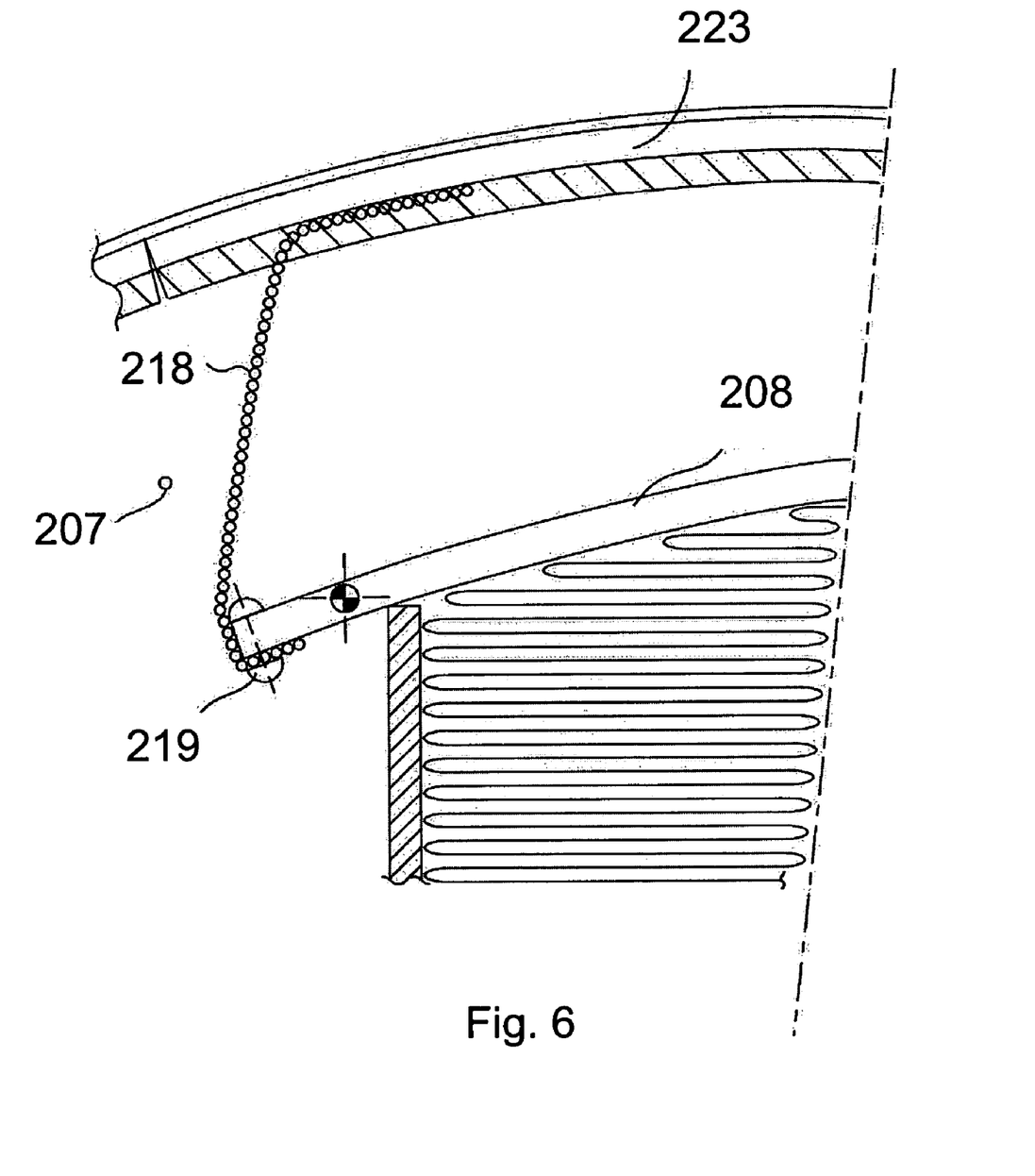
FIG. 6 shows a detail of the pull-back mechanism in a second embodiment
Figure 7:
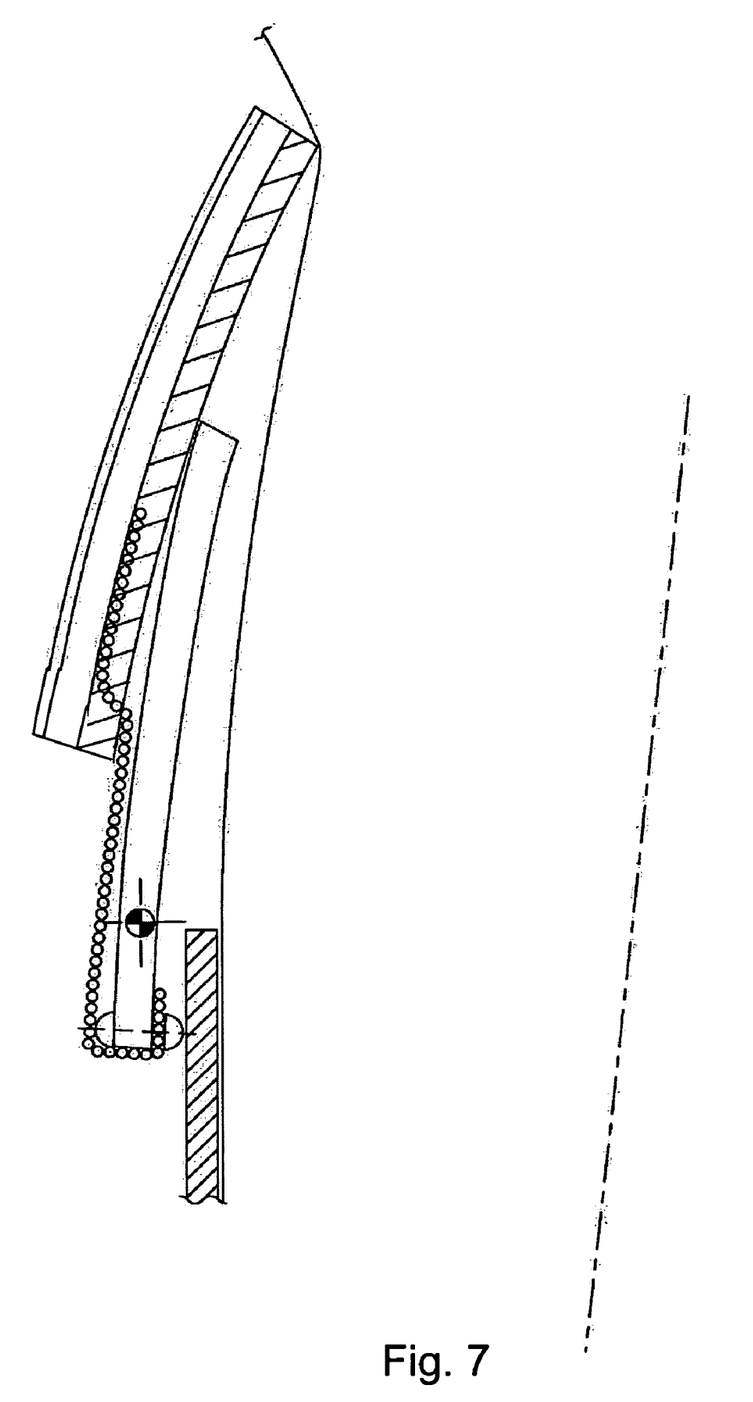
FIG. 7 shows a detail of the pull-back mechanism of FIG. 6 in its final position

FIGS. 6 and 7 likewise illustrate a single-part flap mechanism 208, but with the variant of an elastic, flexurally slack connection between the vehicle interior paneling part 223 and flap mechanism 208. The fastening mechanism of the tension cable or of the fabric layer 218, which is suitable as the connecting element 219, can be designed as a screw connection, rivet connection, clamping connection or adhesive connection or as a combination thereof. With this variant, the structural space 207 which is required for actuating the flap mechanism in order to pull back the vehicle interior paneling part 223, can be minimized. In the end position, the vehicle interior paneling part 223 then bears directly against the flap mechanism of the flap 208.

Figure 8:
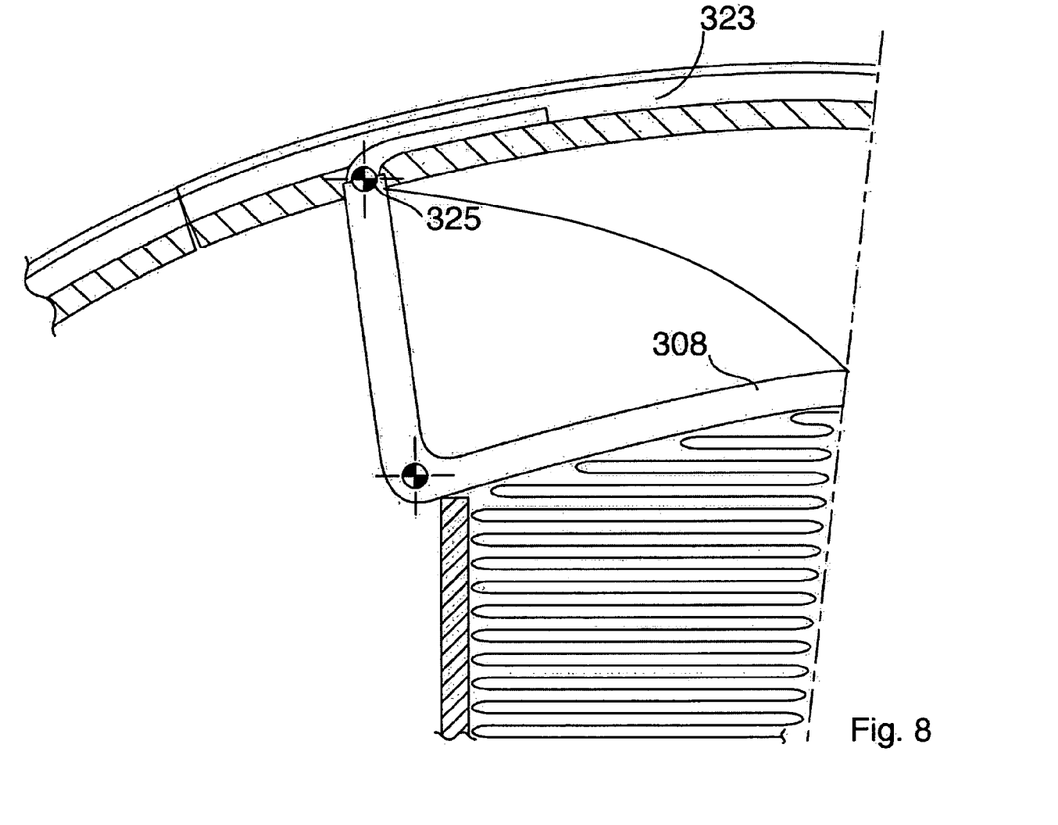
FIG. 8 shows a detail of the pull-back mechanism in a third embodiment
Figure 9:
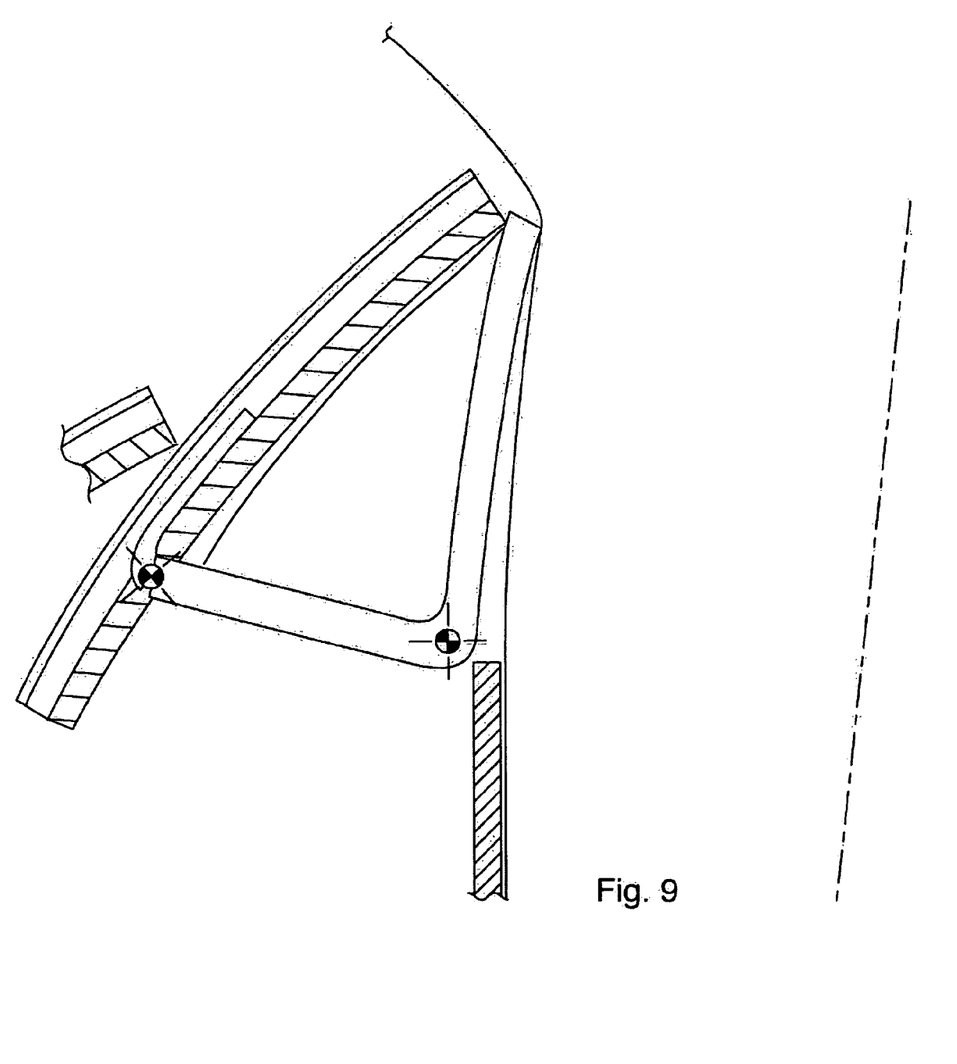
FIG. 9 shows a detail of the pull-back mechanism of FIG. 8 in its final position.

In FIGS. 8 and 9, a single-part, rigid flap mechanism 308 is proposed. In this case, one end of the lever is connected directly to the vehicle interior paneling. The connecting element 325 between the vehicle interior paneling 323 and flap mechanism 308 can be designed either to be stable in terms of angle or else to be changeable in terms of angle, as illustrated in FIG. 9. The hinged mounting in point 325 permits the passage cross-section of the airbag to be increased.

What is claimed is:

1. An airbag construction for protecting vehicle occupants in a motor-driven vehicle, comprising:
    an airbag module including a housing and an airbag retained in the housing and connected to a gas pressure source,
    an interior paneling covering the airbag housing, the interior paneling provided with a weakened zone,
    at least one flap retaining the airbag in folded position, said flap connected with the interior paneling by a connecting element, wherein upon deployment of the airbag, pressure exerted by the airbag causes the flap to open and the interior paneling to rupture into pieces along the weakened zone, such that the connecting element attached to the flap and the interior paneling is able to pull the pieces of the interior paneling away from a deployment path of the airbag, wherein the module is arranged in a retaining device such that a structural space is formed laterally between the retaining device and the module, said space is for receiving the flap and ruptured pieces when the airbag is deployed.

2. The airbag as claimed in claim 1, wherein the connecting element is a slack tensive cable or a strap.

3. The airbag construction of claim 1, wherein the weakened zone is defined by an element selected from the group consisting of a tear seam, a point-by-point perforation line, slots or grooves.

4. The airbag construction as claimed in claim 1, wherein the flap and the connecting element are part of a flap mechanism, wherein the connecting element is rotatably fixed to the module by a hinge point.

5. The airbag construction as in claim 1, further comprising an internalpaneling which includes a covering layer and serving as a boundary to the passenger compartment and formed as a film or plastic support, and a support layer having an optional foam layer situated between the covering layer and support.

6. The airbag construction as claimed in claim 2, wherein the retaining device is fixedly connected to the support layer.

7. The airbag construction of claim 3, wherein the connecting element is made from elastic material.

8. The airbag construction as claimed in claim 1, wherein the connecting element 13 contains a fabric structure.

9. The airbag construction as claimed in claim 1, wherein the connecting element 13 is designed as a stiff lever.

10. The airbag construction as claimed in claim 1, wherein the flap 8 retains the airbag in its folded up position.

11. The airbag construction as claimed in claim 1, wherein the connecting element 13 is fixed on the module by a rotary joint.

12. The airbag construction as claimed in claim 11, wherein a width of the flap from a rotary joint as far as a center of the flap corresponds approximately to a distance of the rotary joint from the vehicle interior paneling.

* * * * *

UNITED STATES PATENT AND TRADEMARK OFFICE
CERTIFICATE OF CORRECTION

PATENT NO. : 7,165,780 B2
APPLICATION NO. : 10/500621
DATED : January 23, 2007
INVENTOR(S) : Jose Maria Segura

It is certified that error appears in the above-identified patent and that said Letters Patent is hereby corrected as shown below:

Title Pg, Item (73) Assignee:

Change "Peguform GmbH & Co. KG" to --Peguform GmbH--

Signed and Sealed this

Thirtieth Day of June, 2009

JOHN DOLL
*Acting Director of the United States Patent and Trademark Office*